United States Patent
Carriker et al.

(10) Patent No.: US 6,571,155 B2
(45) Date of Patent: May 27, 2003

(54) ASSEMBLY, COMPUTER PROGRAM PRODUCT AND METHOD FOR DISPLAYING NAVIGATION PERFORMANCE BASED FLIGHT PATH DEVIATION INFORMATION

(75) Inventors: Michael H. Carriker, Federal Way, WA (US); Darcy L. Hilby, Seahurst, WA (US); Andrew W. Houck, Woodinville, WA (US); H. Rolan Shomber, Woodinville, WA (US); Tom E. Tarleton, Woodinville, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/897,277

(22) Filed: Jul. 2, 2001

(65) Prior Publication Data

US 2003/0004619 A1 Jan. 2, 2003

(51) Int. Cl.⁷ .................. G06F 15/50; G01C 21/00; G08G 1/123
(52) U.S. Cl. .................. 701/3; 701/200; 340/974; 342/47
(58) Field of Search .................. 701/3, 200, 205, 701/9, 16, 14, 5; 340/974, 973, 977, 978, 990, 995, 948, 951, 971, 972, 975, 979; 342/47; 73/178 T; 244/180, 181, 183, 186

(56) References Cited

U.S. PATENT DOCUMENTS

| | | | | |
|---|---|---|---|---|
| 3,521,228 A | * | 7/1970 | Congleton et al. | 340/27 |
| 4,021,009 A | * | 5/1977 | Baker et al. | 244/180 |
| 4,247,843 A | * | 1/1981 | Miller et al. | 340/27 |
| 4,368,517 A | * | 1/1983 | Lovering | 364/428 |
| 4,764,764 A | | 8/1988 | Mulkern | 340/724 |
| 4,860,007 A | | 8/1989 | Konicke et al. | 340/173 |
| 5,289,185 A | * | 2/1994 | Ramier et al. | 340/971 |
| 5,343,395 A | * | 8/1994 | Watts | 364/428 |
| 5,369,589 A | * | 11/1994 | Steiner | 364/449 |
| 5,412,382 A | * | 5/1995 | Leard et al. | 340/974 |
| 5,457,634 A | | 10/1995 | Chakravarty | 364/444 |
| 5,797,106 A | | 8/1998 | Murray et al. | 701/11 |
| 5,916,297 A | | 6/1999 | Griffin, III et al. | 701/120 |
| 6,112,140 A | | 8/2000 | Hayes et al. | 701/14 |
| 6,154,151 A | | 11/2000 | McElreath et al. | 340/970 |
| 6,236,912 B1 | | 5/2001 | Bomans et al. | 701/3 |
| 6,236,913 B1 | | 5/2001 | Bomans et al. | 701/3 |
| 6,240,341 B1 | | 5/2001 | Snyder | 701/3 |

OTHER PUBLICATIONS

Rick Cassell, Alex Smith, Dan Hicok; Development of Airport Surface Required Navigation Performance (RNP); NASA/CR-1999-209109; Jun. 1999; 39 selected pages; Final Report, Mar. 30, 1998; NASA Langley Research Center; Rannoch Corporation; Virginia, USA; Available at <http://www.rannoch.com/PDF/RNP-Report.pdf>.

(List continued on next page.)

Primary Examiner—Tan Q. Nguyen
Assistant Examiner—Dalena Tran
(74) Attorney, Agent, or Firm—Alston & Bird LLP

(57) ABSTRACT

A navigation performance based flight path deviation display assembly includes a display and a display processor capable of generating an image upon the display. The image includes at least one flight path scale comprising a reference point bounded by end markers extending in at least one of a lateral and vertical direction. The display also includes at least one moveable deviation pointer disposed on the flight path scales. Additionally, the image includes a representation of at least one extendable navigation error disposed on the flight path scale, and extending from at least one of the end markers toward the reference point based upon an actual navigation performance (ANP) and the RNP for the aircraft. The image may also include at least one moveable intersecting flight path pointer disposed on the flight path scales.

20 Claims, 10 Drawing Sheets

OTHER PUBLICATIONS

P.B. Ober, E. Theunissen, R.C. Meijer, D. Van Willigen; *RNP Requirements for 4–D Navigation*; The Proceedings of the 11th International Techinical Meeting of The Satellite Division of The Institute of Navigation; Sep. 1998; 9 total pages; Delft University of Technology, Faculty Information Technology and Systems, Telecommunications and Traffic Control Systems Group; Nashville, Tennessee.

Dave Nakamura; *Boeing FMS RNAV Workshop—General Information on the Functional and Technical Aspects of Required Navigation Performance (RNP) Area Nagigation (RNAV) and Applications*; CNS/ATM Technical Requirements and Standards; Feb. 2000; 51 total pages; Available at <http://www.boeing.com/commercial/caft/reference/documents/RHP.pdf>.

* cited by examiner

ASSEMBLY, COMPUTER PROGRAM PRODUCT AND METHOD FOR DISPLAYING NAVIGATION PERFORMANCE BASED FLIGHT PATH DEVIATION INFORMATION

FIELD OF THE INVENTION

The present invention relates to flight path information systems and, more particularly, to flight path information assemblies, computer program products and methods for displaying flight path deviation information based on navigation system performance.

BACKGROUND OF THE INVENTION

In modem commercial aircraft, a flight crew makes flight plan entries and modifications through a Flight Management System—Control Display Unit (FMS-CDU). The FMS-CDU is an electronic module containing a keyboard on its lower face half and an electronic display on its upper face half. By keying entries into the keyboard, the flight crew can build or modify a route into the Flight Management Computer by typing in a series of waypoints which are then displayed, in text form, on the upper half of the FMS-CDU display.

An additionally provided display is a navigation (map) display. In contrast to the text display of the FMS-CDU, the navigation display graphically depicts the selected waypoints along a desired route. Thus, as the flight crew types entries into the FMS-CDU, these are then displayed graphically on the navigation display.

Current FMC's provide for construction of a variety of flight plans, consisting of dot-to-dot leg segments and procedural maneuvers. In addition, conventional FMC's provide an autopilot mode where the aircraft automatically flies according to a predefined flight plan by providing lateral navigation (LNAV) and vertical navigation (VNAV) guidance so that the route can be flown. Most commercial airliners can be flown on a constant heading with the autopilot engaged. This allows interception and tracking of a course outbound from a geographical waypoint. However, due to the effect of wind on the flight plan and other factors, the actual flight path flown by the aircraft often differs from the predefined flight plan, thus requiring constant adjustment to the airplane heading to maintain the desired course.

In order to facilitate adjustment of the airplane heading to maintain the desired course, many conventional FMC's are also capable of determining the position of the aircraft from navigation systems, such as GPS (Global Positioning System), ILS (Instrument Landing System), IRS (Inertial Reference System), VOR (VHF Omni-directional radio Range) and DME (Distance Measuring Equipment). While these sources can provide adequate positioning information, they each have individual drawbacks. For example, while systems such as GPS systems, which acquire positioning information from satellites, can provide positioning information to an aircraft virtually anywhere, the availability of such satellite-based systems can be limited due to factors such as satellite geometry. And while ILS-type systems provide very accurate positioning information, these type systems are ground-based systems and are generally limited to landing procedures at major airports.

Due to the variances in the accuracy of many navigation systems, the United States and international aviation communities have adopted the Required Navigation Performance (RNP) process for defining aircraft performance when operating in enroute, approach and landing phases of flight. RNP is a probabilistic approach to evaluating an aircraft's deviation from its intended course, and has been defined by the International Civil Aviation Organization (ICAO) as "a statement of the navigation performance accuracy necessary for operation within a defined airspace." Currently, several definitions of RNP standards exist, including Boeing RNP, Airbus RNP, RNP-10 and BRNAV/RNP-5. In this regard, according to the Boeing RNP, the navigation performance accuracy can be quantified by a distance in nautical miles, and a probability level of 95% laterally and 99.7% vertically. For example, an aircraft is qualified to operate in an RNP 1 lateral, RNP 250 vertical airspace if it can demonstrate that the capability and performance of the aircraft's navigation system will result in the aircraft being within 1 nmi (nautical miles) lateral of the indicated position on the navigation system at least 95% of the flying time, and within 250 feet vertical of the indicated position at least 99.7% of the flying time.

Expanding upon the lateral navigation accuracy performance standard of 95%, the Boeing RNP defines a lateral integrity containment limit of twice the size of the RNP, centered on the aircraft's predefined path. The integrity containment limit further specifies that the navigation system must ensure the aircraft remains within the integrity containment boundary 99.999% of the flying time.

Currently, to determine whether an aircraft is within the RNP or integrity containment limit, the FMC's calculate a real-time estimate of the navigation system accuracy, commonly referred to as the actual navigation performance (ANP). The ANP is typically calculated by the FMC based upon fault free performance and integrity statistics provided by the GPS receivers or the aircraft's geometry relative to ground based navigation aids, and assumptions on the navigation aid survey location error and performance characteristics. The ANP and RNP are then typically displayed on the FMS-CDU in numeric form along with a large amount of other numerics and text information relating to the intended flight path of the airplane. In order to determine whether the ANP is within the RNP, the display system provides for an "UNABLE RNP" alert when ANP exceeds RNP. This alert does not directly account for RNP changes due to the airplane deviating from the defined path. To account for this, the pilot or other crew member must look at the lateral path deviation displayed on the aircraft Navigation Display and the altitude displayed on the aircraft Primary Flight Display and attempt to determine if the deviation is acceptable for the selected RNP. This display and comparison method of determining whether the ANP is within the RNP requires an unnecessary amount of time, can be very distracting for the pilot and/or air crew member, and is only marginally adequate for low RNP values.

SUMMARY OF THE INVENTION

In light of the foregoing background, the present invention provides an assembly, computer program product and method for displaying navigation performance based flight path deviation information. The assembly, computer program product and method of the present invention provide pilots and/or air crew members with a clear, concise display of the dynamic relationship between ANP and RNP, intersecting flight paths and current actual flight path deviation from a predefined flight path. Also, whereas ILS guidance systems are generally limited to landing procedures at major airports, the assembly, computer program product and method of the present invention provide a deviation display operable for a wider range of airport procedures, including departures, arrivals and approach transitions.

According to one embodiment, a navigation performance based flight path deviation display assembly includes a display and a display processor capable of generating an image upon the display. The image includes at least one flight path scale comprising a reference point bounded by end markers extending in at least one of a lateral and vertical direction, such as the end markers extending equidistant laterally and/or vertically from the reference point on a respective flight path scale. The reference point relates to an actual flight path, and the end markers represent a required navigation performance (RNP). The display also includes at least one moveable deviation pointer disposed on the flight path scales, where the deviation pointer moves between the end markers based upon a deviation of the actual flight path of the aircraft relative to a predefined flight path.

Additionally, the image includes a representation of at least one extendable navigation error disposed on the flight path scale, which defines at least one navigation performance suspect region. The representation extends from at least one of the end markers toward the reference point based upon the actual navigation performance (ANP) and the RNP for the aircraft, where the ANP and RNP are based upon a flight phase of the aircraft. In another embodiment, the representation is capable of identifying the at least one deviation pointer on the representation.

In another embodiment, a flight path intersection display assembly comprises a display and a display processor capable of generating an image upon the display comprising the flight path scales and the deviation pointers. In addition, the image includes at least one moveable intersecting flight path pointer disposed on the flight path scales. The intersecting flight path pointers move in the area between the end markers based upon a distance of the intersecting flight path from the actual flight path.

In operation, the method for providing navigation performance based flight path deviation information begins by providing the flight path scales. Then, a deviation of the actual flight path of the aircraft relative to a predefined flight path is determined, and the moveable deviation pointers are thereafter displayed on the flight path scales based upon the deviation and the reference point. Next, an actual navigation performance (ANP) and the RNP are determined based upon a flight phase of the aircraft, and a representation of at least one extendable navigation error is thereafter displayed on the flight path scales based upon the ANP and RNP. In a further embodiment, deviation pointers on the representation are identified. In embodiments including the intersecting flight path pointers, after displaying the representation, at least one intersecting flight path is identified, and the moveable intersecting flight path pointers are thereafter displayed on the flight path scales based upon a distance of the intersecting flight path from the actual flight path.

The various embodiments of present invention therefore provide pilots and/or air crew members with a clear, concise display of the ANP as it relates to the RNP, intersecting flight paths and current actual flight path deviation from a predefined flight path. The non-distracting and intuitive display of the present invention also allows pilots and/or air crew members to readily determine in a timely manner whether the current navigation performance of the aircraft is within the required navigation performance.

BRIEF DESCRIPTION OF THE DRAWINGS

Figure 1:
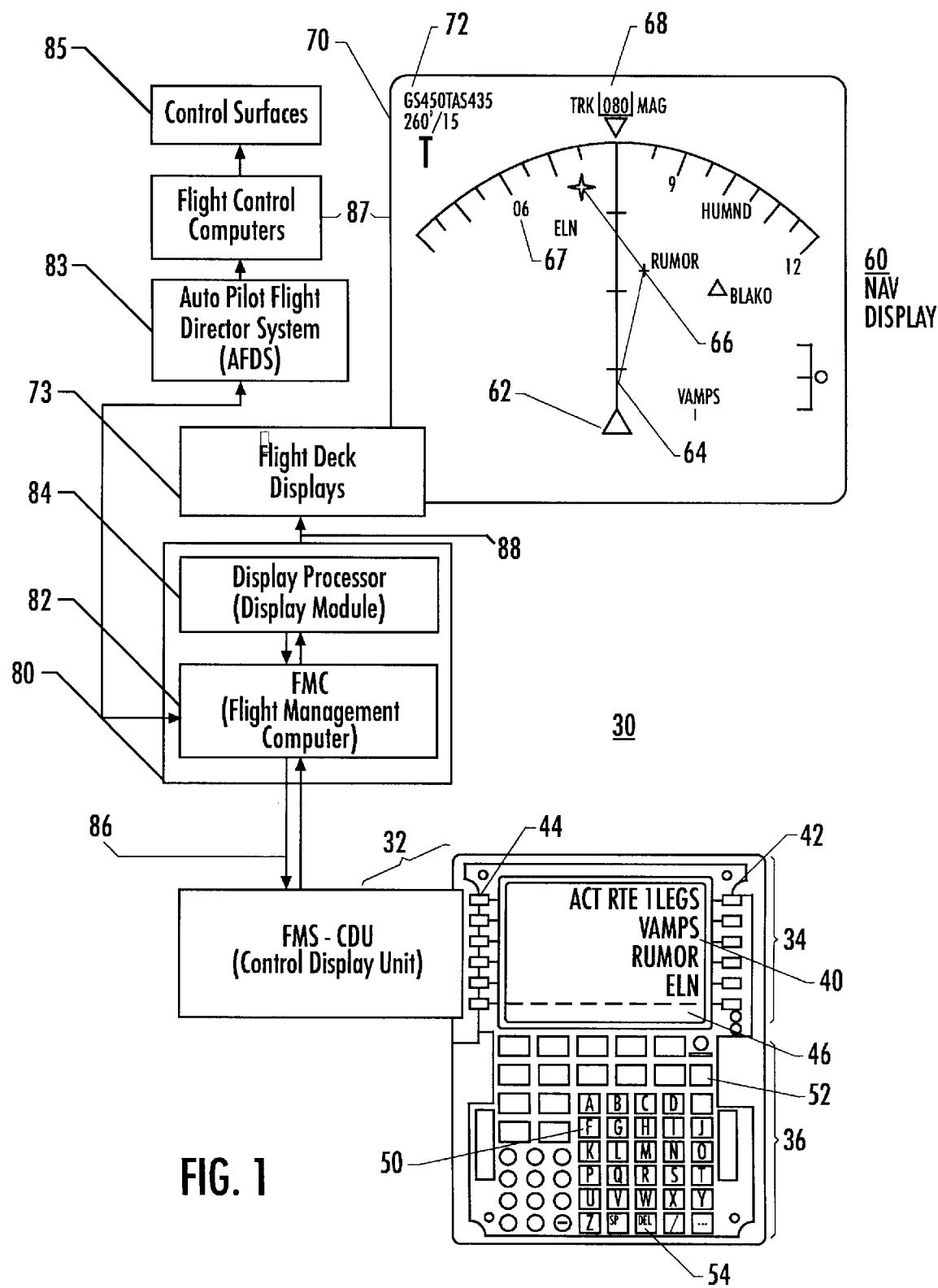
Figure 2:
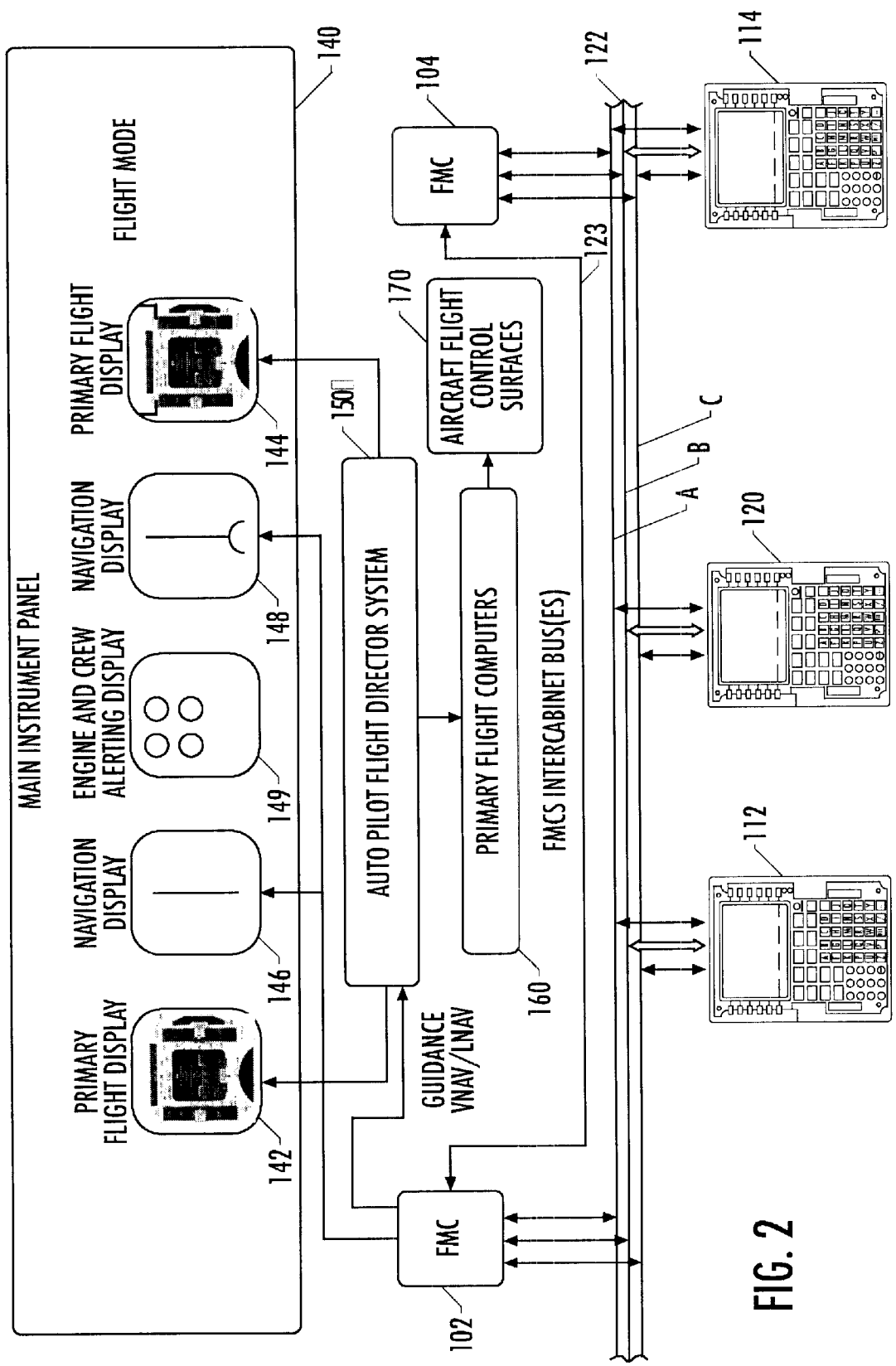
Figure 3:
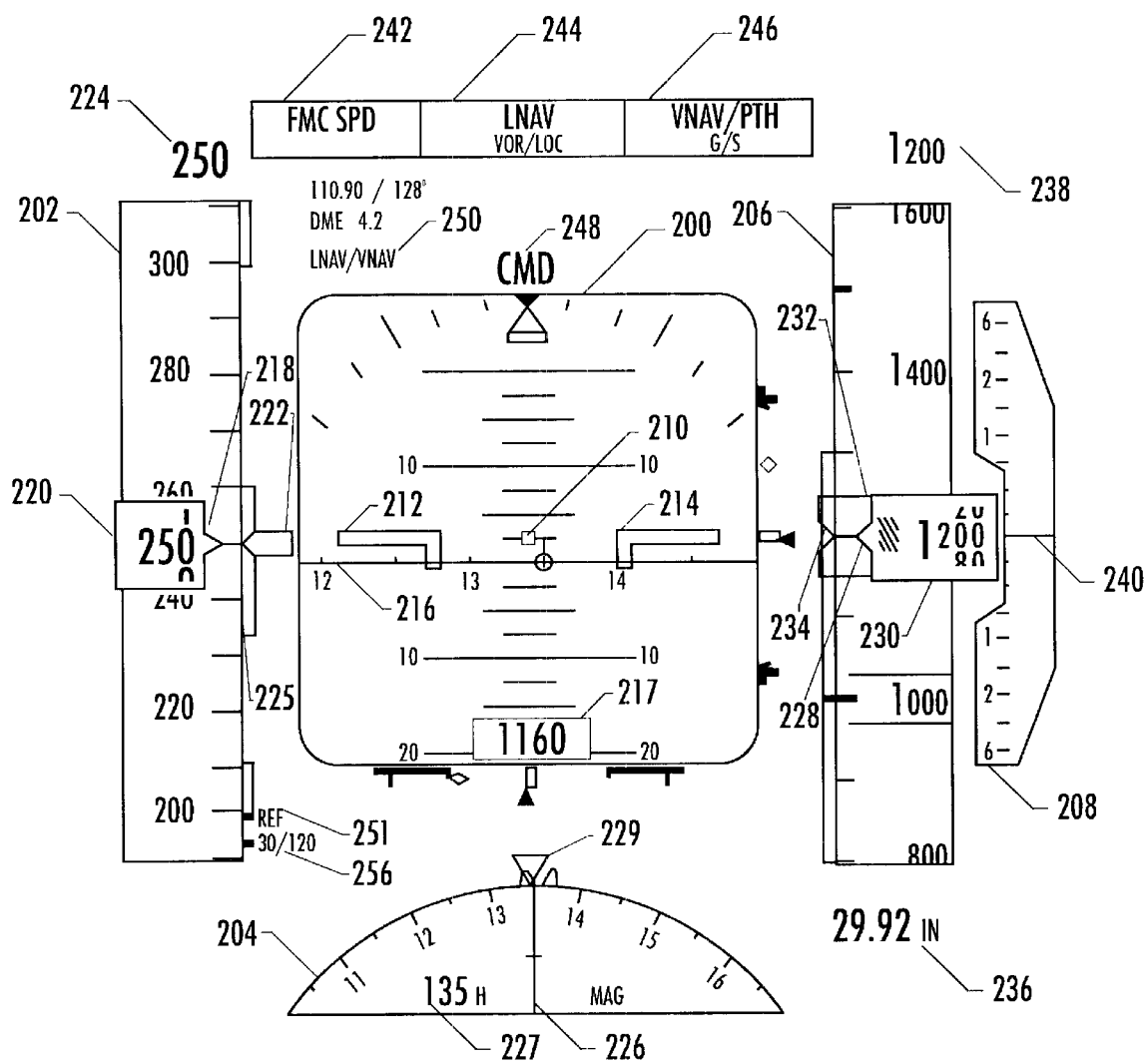
Figure 4:
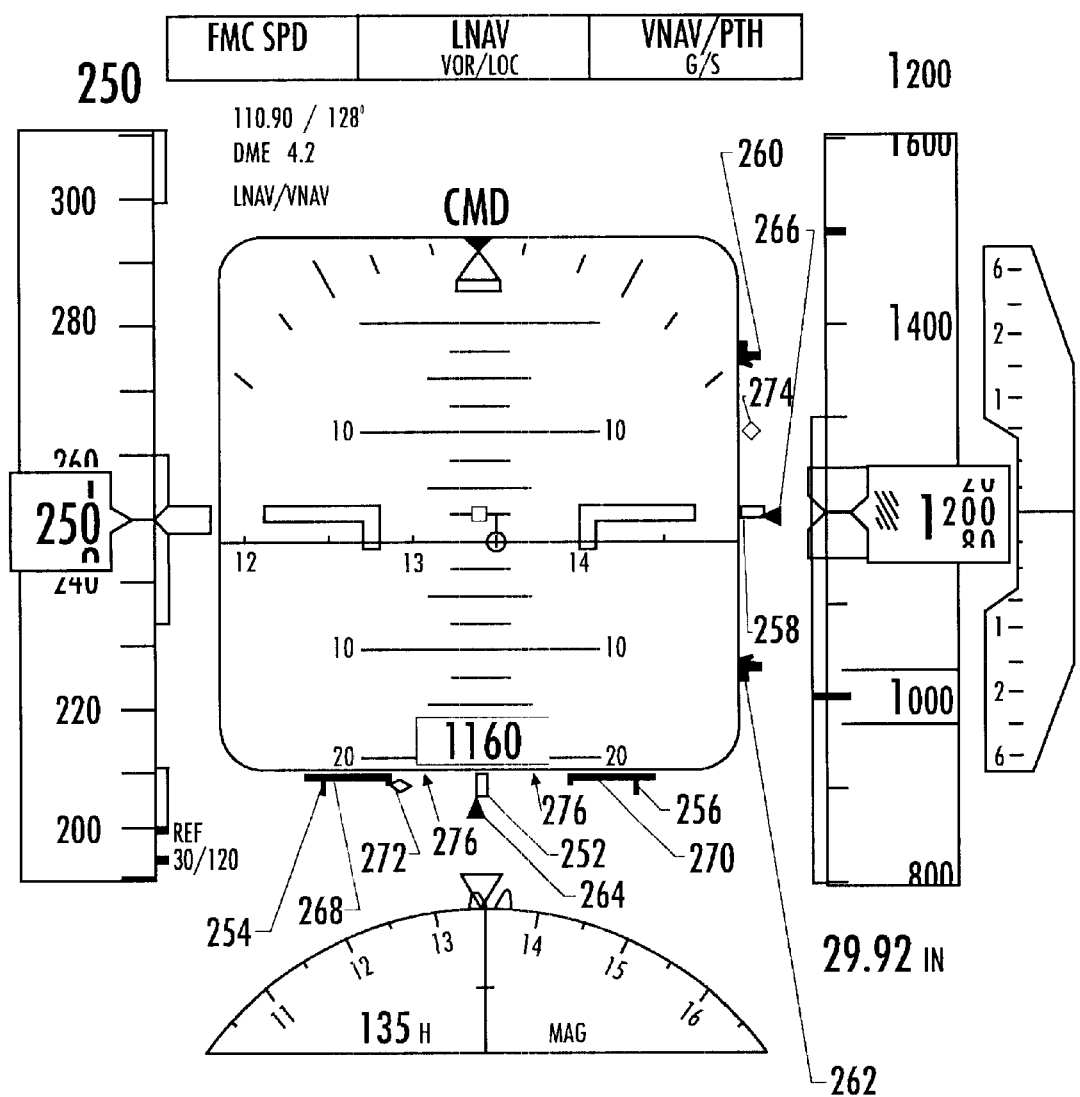
Figure 5A:
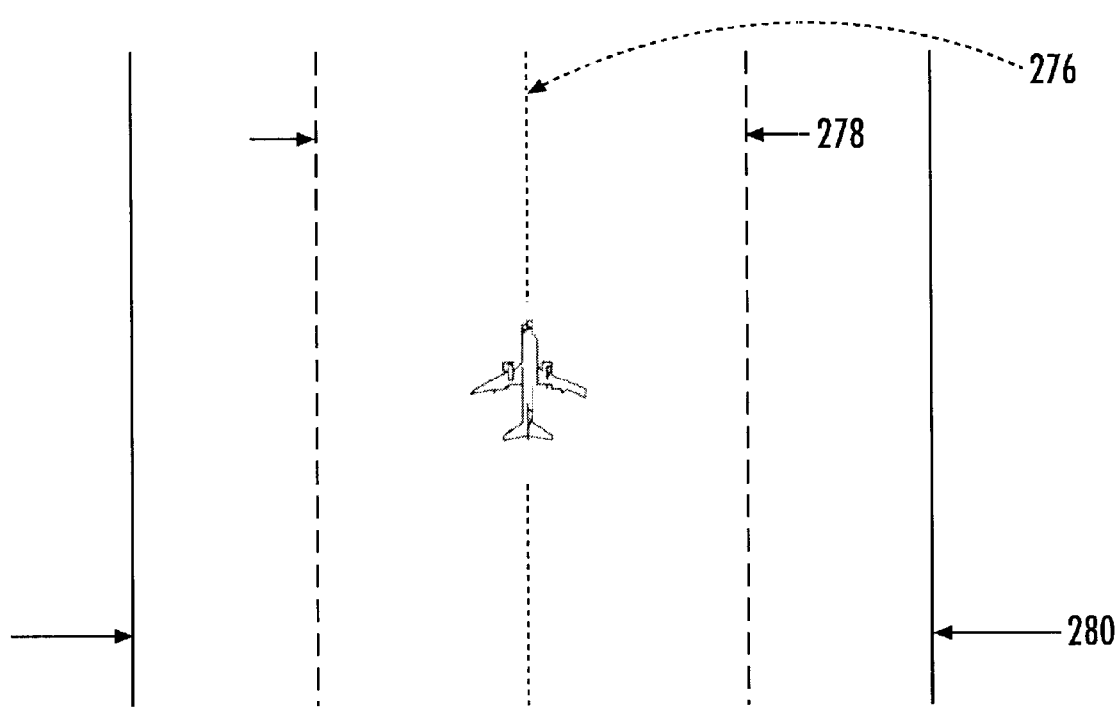
Figure 5B:
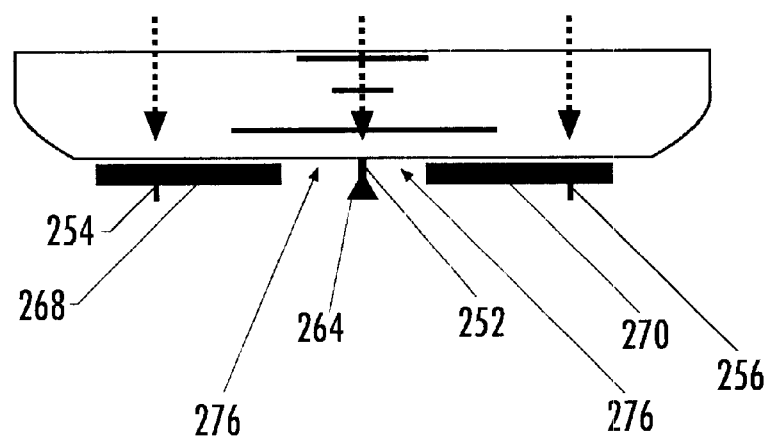
Figure 6A:
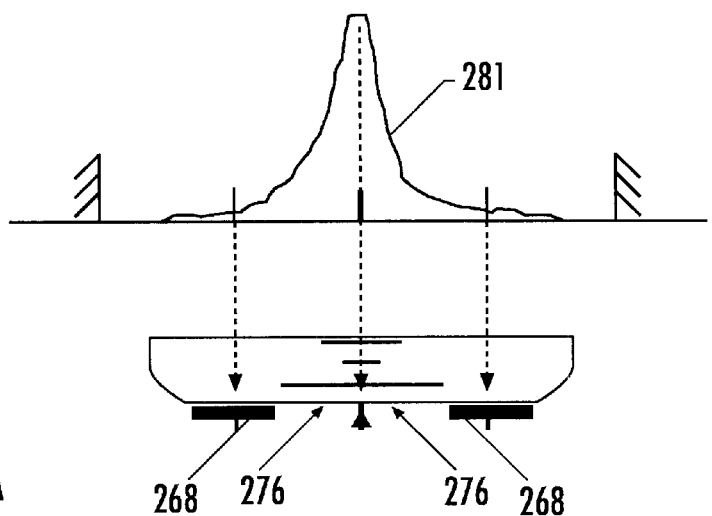
Figure 6B:
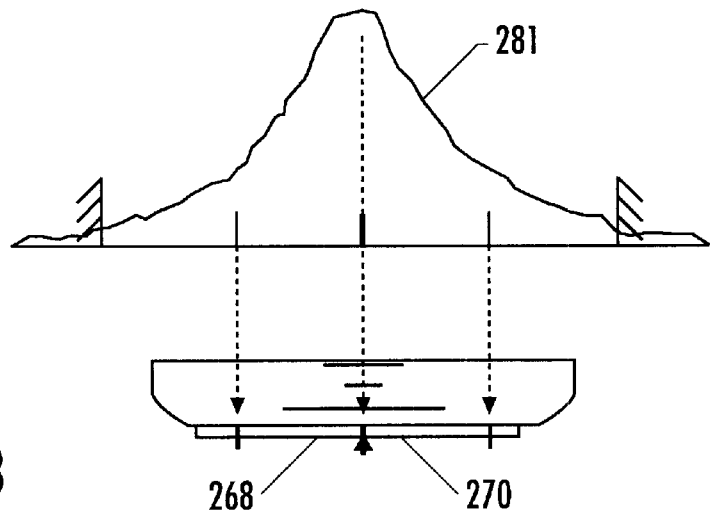
Figure 6C:
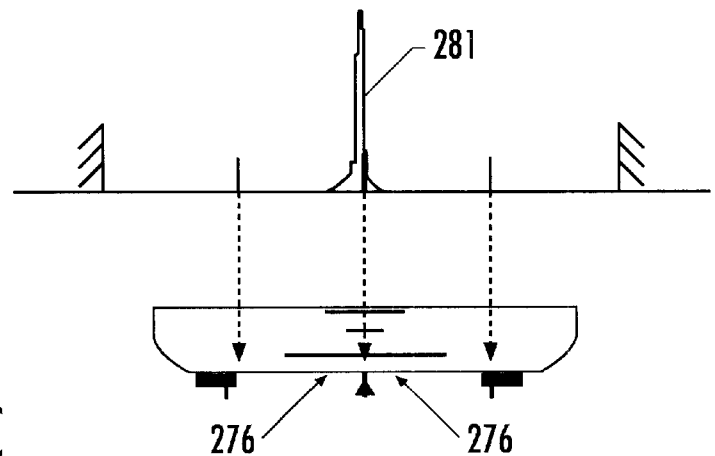
Figure 7:
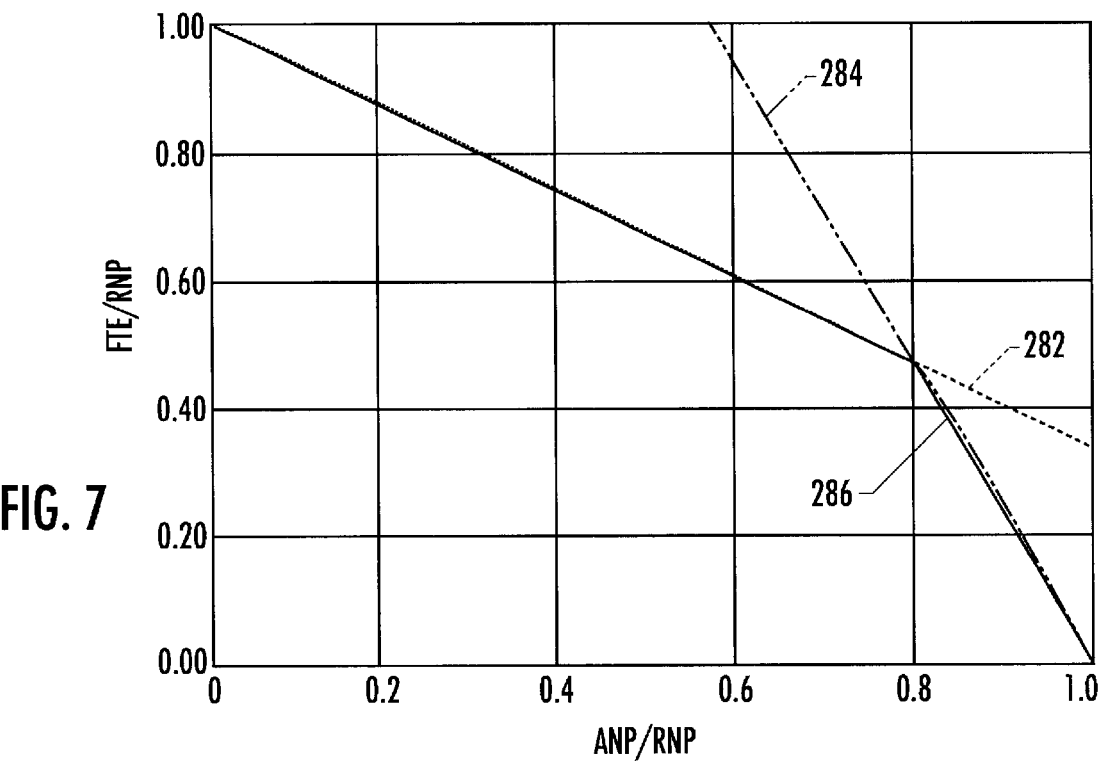
Figure 8:
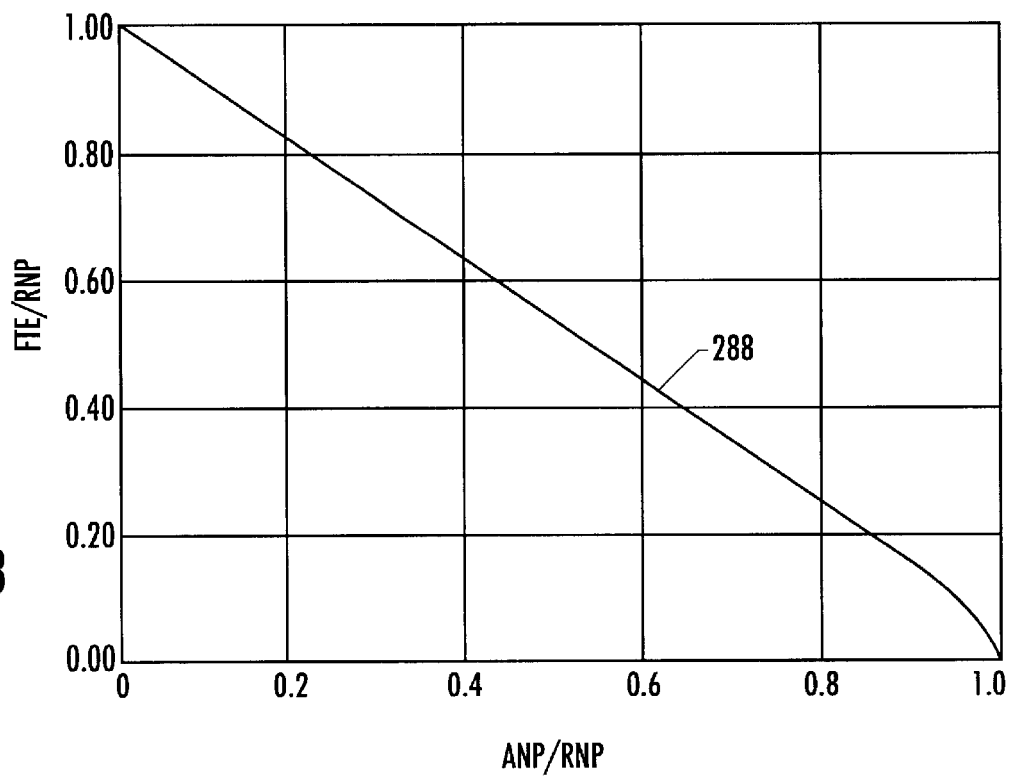
Figure 10:
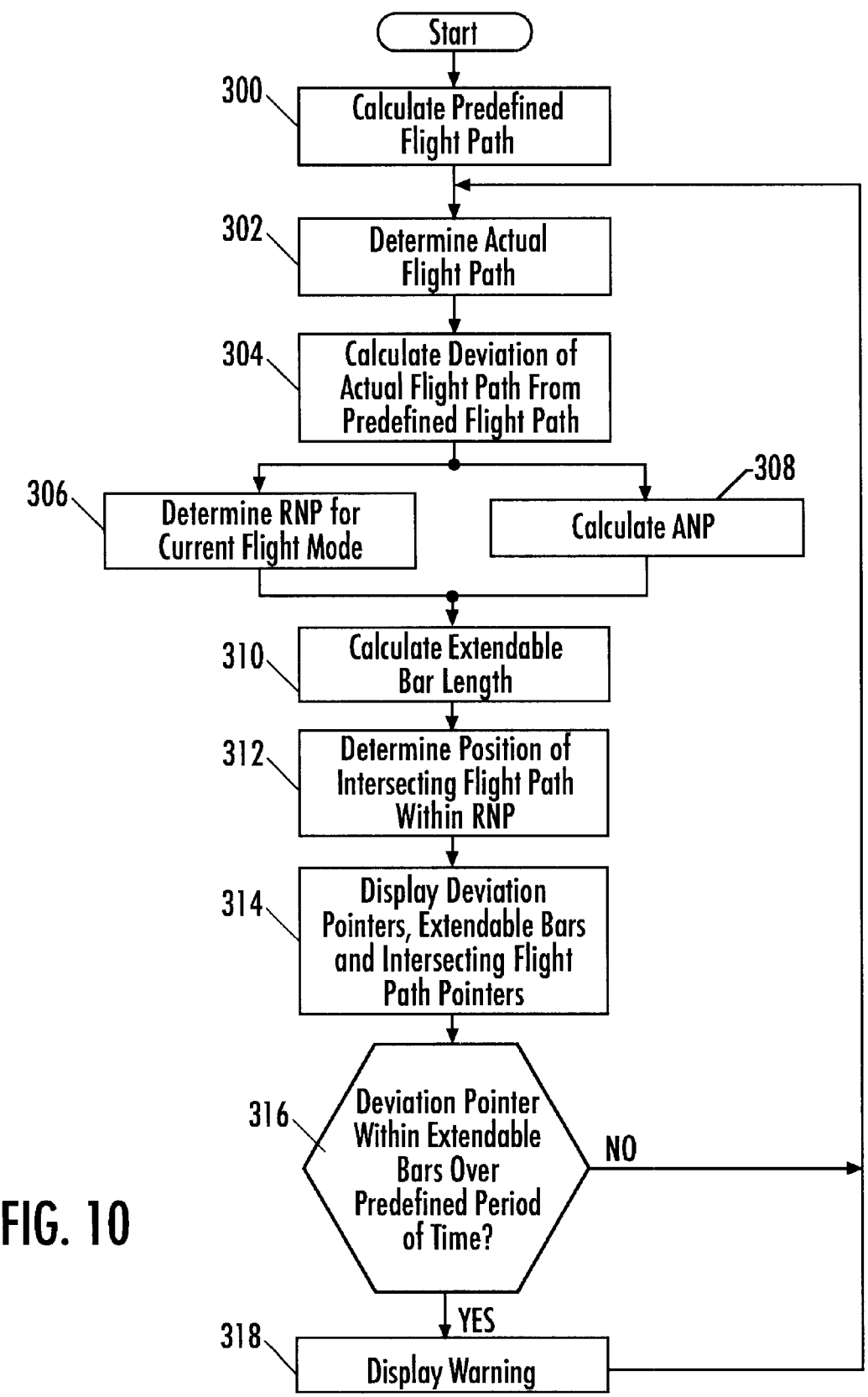
Figure 11A:
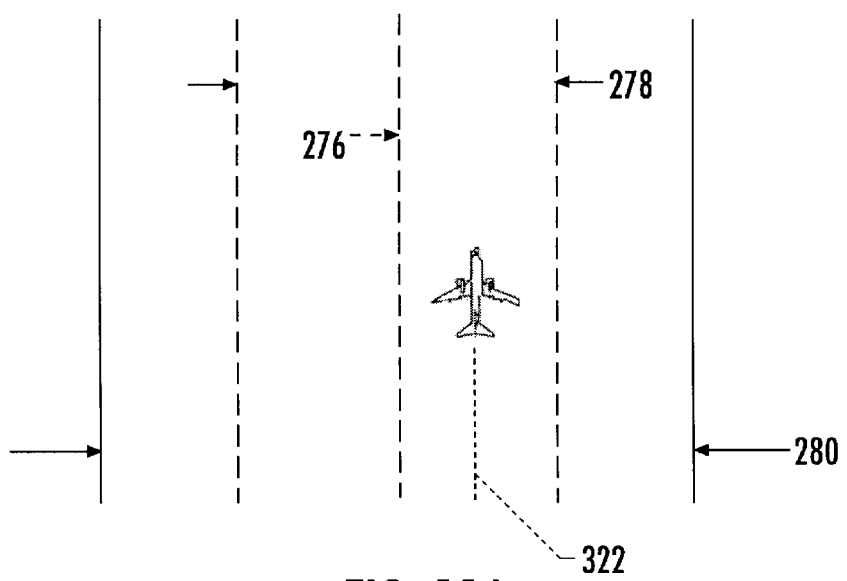
Figure 11B:
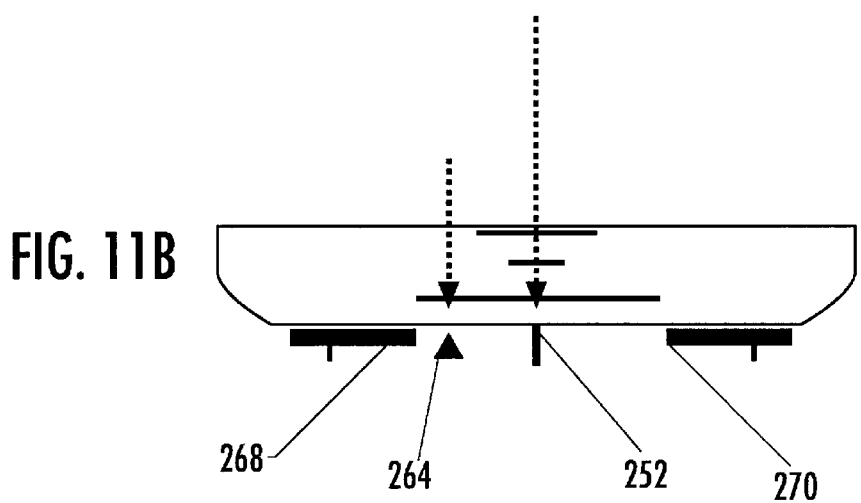
Figure 11C:
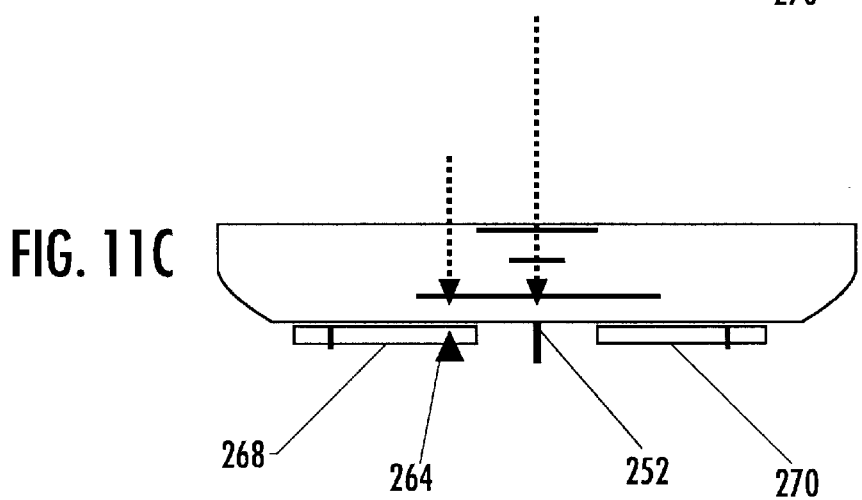

Having thus described the invention in general terms, reference will now be made to the accompanying drawings, which are not necessarily drawn to scale, and wherein:

FIG. 1 is a diagram illustrating the general appearance and relative interconnection of the flight management system including the control display unit (CDU), databuses, navigation display (MAP) and logic module;

FIG. 2 depicts an aircraft main instrument panel and its interconnecting relationship to the flight management computers, autopilot flight director system, flight control computers, interconnecting digital databuses and three CDU's;

FIGS. 3 and 4 illustrate an exemplary primary flight display including flight path deviation information and intersecting flight path information based on RNP and ANP navigation performance, according to one embodiment of the present invention;

FIGS. 5A–5B are schematic diagrams illustrating, according to one embodiment of the present invention, the relationship between the flight path scale, including deviation pointer and representations of navigation error, and the aircraft airspace, including RNP and containment boundary limit;

FIGS. 6A–6C illustrate the probabilistic nature of the ANP related to RNP, as represented by the length of the representations of navigation error, according to one embodiment of the present invention;

FIG. 7 is a graph illustrating allowable lateral flight technical error (FTE) versus lateral ANP, as both relate to lateral RNP, according to one embodiment;

FIG. 8 is a graph illustrating allowable vertical flight technical error (FTE,) versus vertical ANP, as both relate to vertical RNP, according to one embodiment;

FIGS. 9A–9D are schematic diagrams illustrating, according to one embodiment of the present invention, the relationship between the flight path scale, including deviation pointer and the intersecting flight path pointer, and the aircraft position with respect to an intersecting flight path;

FIG. 10 is a flow chart illustrating some of the steps of the method of providing navigation performance based flight path deviation information and intersecting flight path information, according to one embodiment; and FIGS. 11A–11C are schematic diagrams illustrating, according to one embodiment of the present invention, the relationship between the aircraft airspace, including aircraft deviation from the predefined flight path and the representations of navigation error on the flight path scale.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates in both graphic and block diagram form the primary components of a modern commercial flight management system, indicated generally at 30. Although the present invention can be used with the modern commercial flight management system, as discussed below, it should be understood, however, that the present invention could be implemented any number of different electronic systems without departing from the spirit and scope of the present invention. Shown at 32 is a conventional aircraft navigational Flight Management System-Control Display Unit (FMS-CDU). The FMS-CDU includes an upper face portion 34 and a lower face portion 36. In its upper face portion 34, the FMS-CDU 32 includes an electronic display 40 which is capable of displaying lines of text entered by the flight crew. These lines of text depict, typically, waypoints along the path of a desired navigational route. On both sides of and adjacent to the electronic display are line select keys, indicated generally at 42 and 44. Upon the user activating one of the line select keys, the adjacent line of text on the electronic display is activated to thereby allow entry, selection or deletion of text.

At the lower portion of the electronic display is scratch pad line 46 which displays system generated messages, entries via the keyboard (described below) and data being moved from one line to another.

In the lower face half 36 of the FMS-CDU 32 is a keyboard, indicated generally at 50. The keyboard includes an array of keys as well as control inputs by which the flight crew can manually enter waypoints, which then appear on the electronic display 40 as text line items. Also included are various control keys which allow the flight crew to add, modify, and delete various entries.

For example, a provided Execute key 52 is a momentary action push button which becomes illuminated to indicate a modification to the active route. Upon the flight crew pushing the Execute key, a desired modification is activated and illumination of the key is extinguished.

A provided Delete key 54 is a momentary action switch which, when activated by the flight crew, enters DELETE in the scratch pad portion 46 of the electronic display 40. When the scratch pad is blank, a selection of a subsequent line by line select keys 42, 44 deletes data on the corresponding adjacent line if such information is deletable.

Thus, by way of typed entries via the keypad 50, the flight crew enters waypoints along the desired navigational route. These waypoints are displayed as lines of text on the electronic display 40.

Also provided as a display to the flight crew of the desired navigational route is a navigational display (MAP) 60. The navigation display depicts the current position of the aircraft, herein indicated by the triangle 62, and selected waypoints along the desired route such as the indicated waypoint "VAMPS" at 64, the next selected waypoint "RUMOR" at 66 and the final waypoint "ELN" at 67.

In addition to the route information also depicted on the navigation display 60 is the current magnetic track heading 68 and an arcuate line 70 which depicts a portion of a compass rose.

Also depicted in the upper left hand corner of the display 60 is information indicating the current ground speed, true air speed, wind speed and wind heading information, collectively shown at 72.

The flight deck displays 73, including the navigation display 60, and FMS-CDU 32 interconnect through a logic module indicated generally at 80. The logic module includes the flight management computer (FMC) 82. In addition, the logic includes the display processor or computer (display module) 84. Inputs from the logic module to and from the FMS-CDU 32 are carried along a multiple buses 86, whereas display information from the display processor 84 is carried to the flight deck displays via bus 88.

The flight management computer 82 provides lateral (LNAV) and vertical (VNAV) guidance signals to the autopilot flight director system (AFDS) 83, which validates and acknowledges the guidance signals. The AFDS then provides guidance signals to the Primary Flight Computer (PFC) 87 which activates the aircraft's control surfaces 85 in the normal manner such that the aircraft is directed to automatically fly the route as selected by the flight management computer 62.

FIG. 2 illustrates a typical navigation arrangement as found in a modern commercial aircraft. Shown are left and right flight management computers (FMC's) 102, 104, respectively. The left and right FMC's communicate with associated left and right control display units (CDU's) 112, 114, respectively. The left and right CDU's are arranged for easy access by the pilots. As is often provided in modern commercial aircraft, a third, backup, or center channel CDU 120 may also provided. The third CDU is used in some aircraft, such as the 777 family of aircraft manufactured by The Boeing Compayn, to interface to other aircraft systems such as satellite communications, SATCOM, and/or the public address/cabin interphone system (PACI).

The CDU's 112, 114 and 120 and FMC's 102, 104 communicate over a triple redundant data link or bus 122A, B, C. The two FMC's also communicate over an FMC's intercabinet bus 123, the function of which maintains synchronization of data states between the two FMC's.

In normal operation, one of the two FMC's 102, 104 assumes primary control, here identified as left FMC 102. Thus, outputs from FMC 102 are provided both to the main instrument panel 140 and to an autopilot flight director system 150. The main instrument panel includes left and right primary flight displays 142, 144, which are driven by left and right outputs from the autopilot flight director system 150. Left and right navigation displays 146, 148, respectively are driven by corresponding outputs from the primary FMC 102. A central engine and crew altering display 149 is also provided in the main instrument panel 140.

In the manner described with respect to FIG. 1, flight crew entries into the left and right CDU's 112, 114 of desired flight plans are then transferred to the FMC's 102, 104, with corresponding graphical depiction of the flight plans set forth on the left and right navigation displays 146, 148.

Output navigation guidance signals for both vertical navigation VNAV and lateral navigation LNAV are provided from the primary FMC 102 to the autopilot flight director system 150.

The autopilot flight director system 150 then produces corresponding output signals which pass to the primary flight computers 160. The primary flight computers, in turn, produce appropriate control signals which are applied to the aircraft's flight control surfaces 170 to cause the aircraft to fly in accordance with the flight crew entered flight plan in the CDU's 112, 114.

FIGS. 3 and 4 are illustrative of a display, such as that produced by the display processor 84, according to the present invention and suitably comprises a display field presented on a cathode ray tube screen. Although the display can be produced by the display processor within the logic module 80, as discussed herein, it should be understood, however, that the display could be produced by any number of different electronic systems without departing from the spirit and scope of the present invention. Referring to FIG. 3, and the more conventional components of the display, the display field is divided into a number of indicators or indicating areas 200, 202, 204, 206 and 208. A first area 200 comprises a centrally located electronic attitude director indicator which is substantially rectangular in shape having a central boresight box 210 representing the airplane longitudinal axis at the center of the box. On either side thereof are conventional, stationary aircraft symbols 212 and 214. An artificial horizon is provided by line 216 between an upper more lightly shaded area representing the sky and a lower darker area for ground shading. In addition, the lower portion of the attitude director indicator includes a digital readout 217 of the radio or (radar) altitude, which displays the current height of the aircraft above the ground. The overall presentation by the electronic attitude director indicator 200 is substantially conventional.

Adjacent and along the left hand side of attitude director indicator 200 is an air speed presentation 202 comprising a vertically oriented movable scale or "tape" having graduations representing air speed values along the right hand side thereof, i.e., on the side adjacent the attitude director indicator 200. The air speed indicator further includes a fixed pointer 218 which points inwardly toward the air speed scale as well as toward the center of the attitude director indicator. The pointer is provided with a window 220 digitally indicating the air speed in response to instrumentation of the aircraft. As the air speed changes, the scale or tape moves vertically relative to the pointer 218 which continues to point toward boresight box 210. The tape presents a range of speed values above and below the current speed, e.g., between 190 and 310 knots in the particular illustration, with the numerics being disposed immediately to the left of the corresponding scale graduations. Portions of the scale or tape above and below the viewable range are blanked from the presentation. Moreover, the scale is blanked at the location of window 220 which supplies the numerical readout of the current speed as a "rolling" number. The scale right hand edge of the tape is not obscured by pointer 218 or window 220.

The air speed indicator further includes a pilot controlled marker or "bug" 222 consisting of a pointer, with the current value of the selected air speed (e.g., 250 knots) being numerically displayed at location 224 above the air speed presentation. When the selected air speed is attained, the marker or "bug" will reach pointer 218. The marker 222 has a parked position at the upper end of the indicator 202 and at the lower end of indicator 202 when the selected air speed is outside the values depicted by the air speed tape, and at such time only one of the horizontal markers will appear at the end of the tape. The air speed indicator may also include a guidance speed band 225 to indicate an allowable range of air speeds accompanying the VNAV and LNAV navigation guidance signals. In addition, the air speed indicator may include a reference target speed (REF) marker 251 along the indicator 202, and a selected landing flap position along with an associated reference speed (e.g., 30/120). Indicator 204 for aircraft heading comprises a raster-shaded area having the shape of a segment of a circle or compass rose which is easily comprehensible by the viewer. The indicator 204 is provided with a degree scale along the upper, arc-shaped portion thereof adjacent attitude director indicator 200, and like the previously described indicator 202, the scale of heading indicator 204 moves with respect to a fixed pointer numbered 229. Below the fixed pointer, the indicator includes a track indicator 226 that moves as the track varies in relation to the heading. To the left of pointer 226 is a location 227 which digitally displays the present heading. For other than the segment of the heading display as illustrated in FIGS. 3 and 4, the compass rose is blanked out, and is also blanked at location 227 where the numeric readout is presented. However, neither pointer nor window obscure the upper scale.

A further, vertically disposed indicator 206 is located adjacent the right hand side of attitude director indicator 200 in FIGS. 3 and 4, and is provided with an altitude scale along the left hand side thereof, i.e., adjacent indicator 200. The indicator 206 is further provided with altitude numerics to the right of appropriate indicia on the scale. The indicator is of the moving scale or moving tape type wherein the scale moves with respect to fixed pointer 228 as the altitude of the aircraft changes, with the current value of the selected altitude being numerically displayed at location 238 above the air speed presentation. Fixed pointer 228 includes an adjacent window within which the correct altitude is digitally displayed in rolling number fashion. Thus, as altitude information from aircraft instrumentation changes, both the numerical indicia in window 230 and the position of the underlying tape change accordingly.

Altitude indicia for altitudes above and below the range depicted on the viewable scale or tape, here approximately eight hundred feet, are blanked, as is the scale beneath window 230. Pointer 228 and window 230 do not block the view of indicia along the left hand side of indicator 206, but points fixedly toward such indicia, and at the center of attitude director indicator 200. The altitude indicator 206 further includes a marker or "bug" which is pilot positionable along the left hand side of the scale. A box-like marker or bug 232 having a centrally inwardly directed pointer 234 is pilot positionable along the left hand edge of the scale, with the arrow 234 pointing at a desired altitude in sliderule fashion. The digital readout at position 236 at the lower end of indicator 206 represents the barometric setting in inches of mercury.

The display of FIGS. 3 and 4 also include a vertical speed indicator 208 calibrated in thousands of feet per minute along the left hand side thereof adjacent indicator 206. The shaded area comprising indicator 208 is somewhat trapezoidal in shape, widening toward indicator 206, and is provided with a movable pointer 240 adapted to indicate the current vertical speed of the aircraft by pointing to the indicia of the scale along the left hand side of indicator 208. The last mentioned scale is fixed in position. Pointer 240 is angularly movable from an apparent origin to the right of the scale, from which the pointer appears to extend radially outwardly. Not only does pointer 240 point to indicia along the left hand side of fixed vertical speed scale of indicator 208, it is also used to point toward a selected altitude on the altitude scale of indicator 206, here identified by the aforementioned marker or bug 232.

After the pilot selects a desired altitude and marker 232 identifies the same, the vertical speed of the aircraft can be controlled so that pointer 240 points toward the selected altitude, and under these circumstances the vertical speed will be optimal for leveling out at the desired altitude. It will be seen that as the desired altitude is approached, and as the vertical speed of the airplane is controlled so that pointer 240 continues to point toward marker 232 while the latter moves downwardly, the vertical speed of the airplane will decrease or the airplane will decelerate in a vertical direction whereby the desired altitude will be attained in an optimized way.

As an additional feature of the indicator 208, the vertical speed scale is expanded toward zero vertical speed to enhance proper deceleration toward the desired altitude. In a specific embodiment, the scale, compressed farther from the zero or center vertical speed index, is piecewise linear between indicia identified by numerics to the left of the indicia.

It has been found advantageous, in respect to achieving a given change in altitude, that the vertical speed be approximately three times the change in altitude desired, at least for vertical speeds between zero and one thousand feet per minute. The relationship of the scale of indicator 208 to the scale of indicator 206 is adapted to achieve this result as will be appreciated from comparing the scales. In coordinating the two scales, it is generally desirable that the altitude scale of indicator 206 be optimized in regard to indicia spacing for best pilot readability and performance, while the scale of indicator 208 is adapted accordingly.

The display of FIGS. 3 and 4 also includes flight mode annunciator readouts 242, 244 and 246 at the top center of the display. The three columns are reserved for autothrottle status, lateral mode status and vertical mode status. It is noted these annuciations are arranged in an order which associates the column content to the display feature in closest proximity. In particular, autothrottle mode is closest to the speed tape, vertical mode is closest to the altitude tape and lateral mode is in the center, relating to the bank scale or heading indicator. Flight director, autopilot and autoland status annuciations are displayed at location 248 immediately above the attitude director indicator center, requiring a very short scan. In addition, location 250 may include characteristics of the approach, including station frequency and runway heading (in degrees), Distance Measuring Equipment (DME) readout in nautical miles and the current mode status.

Reference is now made to FIG. 4 and the navigation performance based flight path deviation and intersecting flight path information of the display. Although the navigation performance based flight path deviation and intersecting flight path information is described herein in conjunction with a conventional primary flight display, it should be understood that the navigation performance based flight path deviation and intersecting flight path information could be presented in any number of different manners without departing from the spirit and scope of the present invention. Preferably located adjacent the bottom and right sides of the attitude director indicator 200, depending on the mode of the aircraft, the display includes flight path scales corresponding to the lateral and vertical flight paths of the aircraft. The lateral flight path scale, which is displayed when LNAV mode is active, includes a fixed reference point 252 representing the actual lateral flight path of the aircraft. The fixed reference point 252 is bounded by left 254 and right 256 end markers, which represent the Required Navigation Performance (RNP), discussed below. Whereas the reference point can be situated anywhere between the end markers, in a preferred embodiment the reference point is centered between the end markers, which then extend equidistant from the reference point. Similarly, the vertical flight path scale, which is displayed when VNAV mode is active, includes a fixed reference point 258 representing the actual vertical flight path of the aircraft. The fixed reference point 258 is bounded by top 260 and bottom 262 end markers which define the vertical RNP for the flight path of the aircraft.

Within the lateral flight path scale, the display includes a pilot and/or autopilot controlled marker or "bug" consisting of a lateral deviation pointer 264. The lateral deviation pointer represents the desired, predefined LNAV guidance flight path of the aircraft with respect to the actual lateral flight path. In this regard, the distance between the deviation pointer and the reference point represents the deviation of the aircraft with respect to the LNAV guidance flight path such that when the actual lateral flight path of the aircraft equals the LNAV flight path, the deviation will be zero. And when the deviation is zero, the deviation pointer will coincide with the reference point 252. Similarly, within the vertical flight path scale, the display includes a pilot and/or autopilot controlled marker or "bug" consisting of a vertical deviation pointer 266. The vertical deviation pointer represents the desired, predefined VNAV guidance flight path of the aircraft with respect to the actual vertical flight path.

Also within the lateral flight path scale, the display includes a representation of at least one extendable navigation error 268 and 270, hereinafter referred to as extendable bars. Although not illustrated, depending on the application and operation of the navigation system, the vertical flight path scale may similarly include vertical extendable bars. The lateral extendable bars extend from left 254 and right 256 end markers toward the reference point 252 of the lateral flight path scale based up on the current accuracy of the aircraft's navigation system (i.e., ANP) in relation to the RNP, as discussed below. The area within the extendable bars represents a navigation performance suspect region, while the area between the reference point and the extendable bars represents a confidence region 276.

In addition to the extendable bars 268, 270, the lateral and vertical flight path scales may include lateral and vertical intersecting flight path pointers 272, 274. The intersecting flight path pointers represent an intersecting flight path, such as an ILS path, within the RNP boundary of the end markers 254, 256. The intersecting flight path pointers are moveable along the respective flight path scale based upon a distance of the intersecting flight path from the actual flight path.

To provide a better understanding of the operation of the extendable bars 268, 270, reference is now made to FIGS. 5–7. It should be noted, however, that while FIGS. 5–7 illustrate only the lateral flight path scale and associated extendable bars, the display of the present invention can similarly include a vertical flight path scale and extendable bars without departing from the spirit and scope of the present invention. Also, while RNP shall refer to the Boeing RNP definition, the present invention can be operated with any definition of RNP, including Airbus RNP, RNP-10 and BRNAV/RNP-5, without departing from the spirit and scope of the present invention.

Referring to FIG. 5A, an aircraft can be defined from a predefined path 276 within an inner RNP limit 278 and an outer, integrity containment boundary limit 280. As stated, RNP defines the navigation performance accuracy necessary for aircraft operation within a defined airspace which, according to the Boeing RNP definition, requires an aircraft to be able to stay within the RNP limit 95% of the flight time for every mode of flight. The integrity containment boundary limit, which is typically only a lateral definition, is an additional requirement that is twice the size of the RNP limit, centered on the aircraft's predefined path. The integrity containment boundary limit specifies a safe separation distance between the aircraft and obstacle clearance when developing routes, areas and procedures. And according to the Boeing RNP definition, an aircraft must be able to stay within the integrity containment boundary limit 99.999% of the flight time.

Referring to FIG. 5B, the extendable bars 268, 270 represent the current, real-time ANP in relation to the RNP for the current flight phase of the aircraft. In this regard, the extendable bars represent a navigation suspect area where the current ANP exceeds the RNP for the current flight phase of the aircraft. Similarly, the area between the extendable bars and the reference point 252 represents a confidence region 276, representing an amount of allowable flight technical error (FTE), or total system error (TSE), relative to the current RNP. In the confidence region, in contrast to the suspect area, the ANP is below the current RNP. Because the ANP is dynamic and can vary with factors such as navigation sensor selection, aircraft system faults, external navigation aid failures and aircraft to navigation aid geometry, and because the RNP varies depending on the flight phase of the aircraft, the extendable bars extend and retract as the ANP and/or RNP vary.

As stated, the Required Navigation Performance (RNP) process is a probabilistic approach to evaluating an aircraft's deviation from its intended course. In this regard, a standard distribution curve 281 can be used to represent the relationship between the ANP and RNP, with the area underneath the curve proportional to the length of the extendable bars 268, 270, as shown in FIGS. 6A–6C. Because RNP represents the minimum required navigation performance, it is desirous that the ANP remain as far under the RNP as possible, preferably approaching zero. In this regard, the extendable bars extend from the left and right end markers toward the reference point as the ANP approaches the RNP, as shown in FIGS. 6A and 6B. Similarly, the extendable bars retract toward the left and right end markers as the ANP approaches zero, as illustrated in FIG. 6C.

Referring now to FIG. 7 with respect to the lateral flight path scale, the length of the extendable bars 268, 270 are typically determined with respect to the allowable FTE, which can be calculated by evaluating the inverse probability at 95% for the RNP limit, and 99.999% for the integrity containment boundary. Whereas separate extendable bars could be displayed for the RNP limit and the integrity containment boundary, in a preferred embodiment the extendable bars take into account the more restrictive integrity containment boundary. Plotting the ratio ANP/RNP versus the allowable FTE/RNP for the RNP limit (line 282) and the integrity containment boundary (line 284), the relative length of the confidence region can be seen, as shown in FIG. 7. Whereas the length of the confidence region can be determined by directly evaluating the RNP limit and integrity containment boundary independently, in a preferred embodiment, the length of the confidence region can be approximated (line 286) according to the following equation:

$$FTE/RNP_L = \min(1 - 0.67 \times (ANP_L/RNP_L), 2.2 \times (1 - ANP_L/RNP_L))$$

Referring to FIG. 8, similar to the lateral extendable bars 268, 270 of the lateral flight path scale, determining the length of the vertical extendable bars is typically determined relative to the vertical allowable FTE, which can be calculated by evaluating the inverse probability at 99.7% for the RNP limit. Unlike the lateral allowable FTE, the vertical allowable FTE typically does not contain an integrity containment boundary component. However, it should be understood that the vertical allowable FTE and, thus the vertical extendable bars, could include an integrity containment boundary component without departing from the spirit and scope of the present invention. Plotting the ratio ANP/RNP versus the allowable FTE/RNP for the RNP limit, the length of the vertical confidence region can be seen, as shown in FIG. 8. Whereas the length of the confidence region can be determined by directly evaluating the RNP limit directly, in a preferred embodiment, the length of the vertical confidence region can be approximated (line 288) according to the following equation:

$$FTE/RNP_V = RNP_V \times \sqrt{(1 - 0.85 \times (ANP_L/RNP_L) + 0.85 \times (ANP_L/RNP_L)^2)}$$

With respect to the intersecting flight path pointers 272, 274, reference is now made to FIGS. 9A–9D, which illustrates an aircraft flying toward a horizontal intersecting path and the corresponding horizontal flight path scale. Although the illustrations depict only a horizontal intersecting flight path and horizontal flight path scale, it should be under that the display could additionally or alternatively include a vertical flight path scale with a vertical intersecting flight path pointer as the aircraft flies toward a vertical intersecting flight path.

Figure 9A:
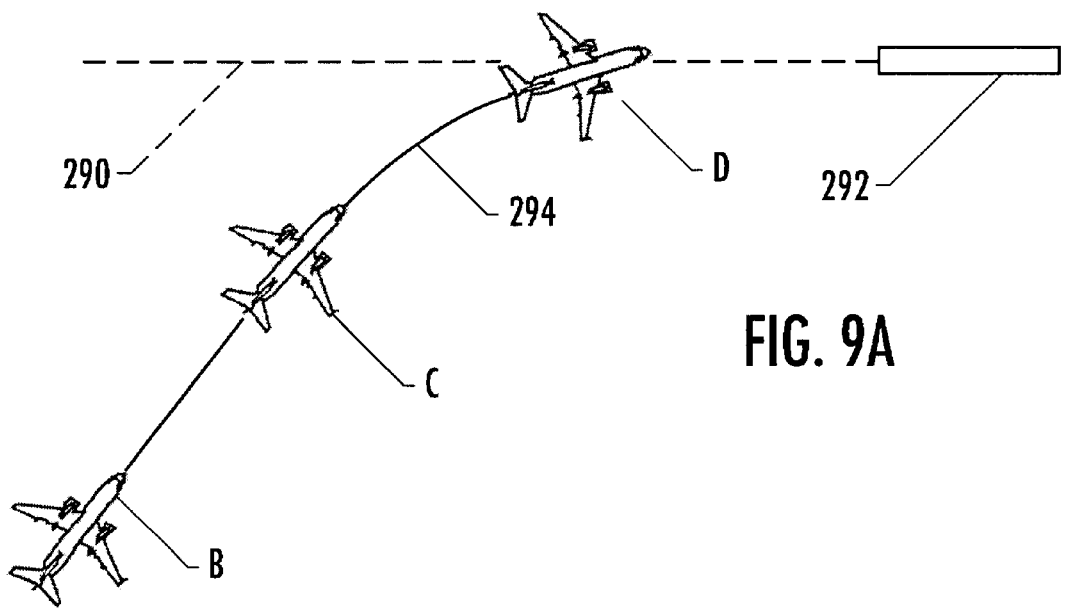
Figure 9B:
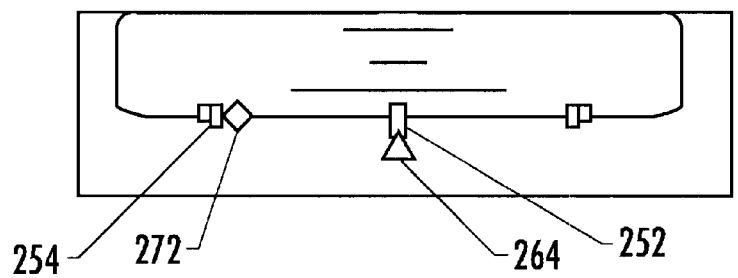

Often during flight, aircraft approach different flight paths, which can define different modes of flight. For example, as illustrated in FIG. 9A, an aircraft flying in autopilot mode can move toward an ILS flight path 290 as the aircraft advances toward a final approach to a runway 292. As illustrated, the aircraft is flying an actual flight path along a predefined flight path 294 such that the deviation pointer 264 aligns with the reference point 252 of the horizontal flight path scale. As the aircraft flies toward the intersecting flight path 290, the aircraft proceeds from position B, through position C, to position D. When the horizontal position of the aircraft is within the RNP of the intersecting flight path, the display displays an intersecting flight path pointer 272 on the flight path scale. When the aircraft is at position B, the intersecting flight path pointer is just within the left RNP end marker, as shown in FIG. 9B.

Figure 9C:
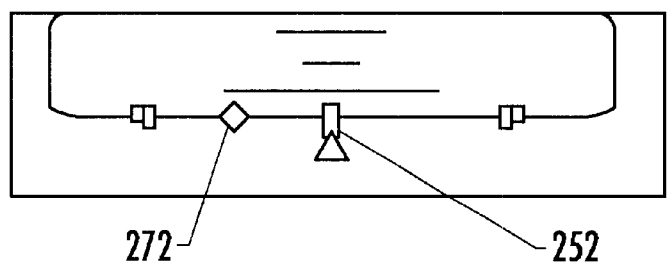
Figure 9D:
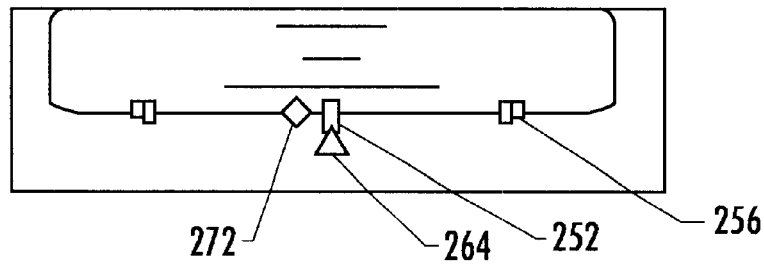

As the aircraft approaches the intersecting flight path 322, the intersecting flight path pointer 272 moves along the flight path scale toward the reference point 252, as shown in FIG. 9C. When the aircraft reaches the intersecting flight path, the intersecting flight path pointer approaches alignment with the reference point and, as illustrated, the deviation pointer 264, as shown in FIG. 9C. Although not illustrated, if the aircraft were to bypass the intersecting flight path, the intersecting flight path pointer would bypass the reference point on the flight path scale and proceed toward the right end marker 256. At the point the aircraft intersects the intersecting flight path, the aircraft can alter it's flight path to thereby follow the intersecting flight path, such as by following an intersecting ILS flight path. At this point, the aircraft might typically change autopilot modes from LNAV and VNAV to LOC and G/S.

Reference is now made to FIG. 10, which is exemplary of a method of utilizing the present invention. According to the method, when the air crew desires to fly a desired flight plan utilizing LNAV and/VNAV guidance, the air crew enters into the left and right CDU's 112, 114 the lateral and/or vertical desired flight plan, which are then transferred to the FMC's 102, 104, as described above. The primary FMC calculates the predefined flight path according to the desired flight plan and outputs navigation guidance signals for vertical navigation VNAV and/or lateral navigation LNAV, and transmits the LNAV and/or VNAV signals to the autopilot flight director system 150. (Block 300).

To determine the deviation of the actual flight path of the aircraft with respect to the desired flight path, the actual flight path of the aircraft is continuously acquired, such as by the FMC's 102, 104, using position sensor information, such as from a GPS (Global Positioning System), an IRS (Inertial Reference System) and a ground-based radio system. (Block 302). From the actual flight path and the predefined flight path, the deviation of the aircraft from the predefined flight path can be continuously calculated, which is typically accomplished by the primary FMC and thereafter transmitted to the display processor 84. (Block 304). Typically, the deviation is transmitted to the display processor as lateral and vertical errors in nautical miles lateral and in feet vertical, which the display processor continuously translates to position the deviation pointers.

After the deviation of the aircraft has been calculated, or as the deviation of the aircraft is being calculated, the RNP and ANP for the aircraft are continuously determined. The RNP for the current flight phase is determined, typically in the FMC's 102, 104 by using an internal database of predetermined RNP values. (Block 306). For example, an aircraft flying in an enroute flight phase might have a predetermined RNP value of 4.0, while an aircraft flying in the terminal area might have an RNP of 1.0 nm. Additionally, or alternatively, the RNP for the current flight phase can be manually inputted into the FMS-CDU 32. The ANP is calculated, typically by the primary FMC, according to factors such as navigation aid performance characteristics and aircraft geometry, as such is known to those skilled in the art. (Block 308). The FMC continuously determines the RNP and ANP based upon the current flight phase of the aircraft and the instantaneous navigation performance of the aircraft, and thereafter transmits the RNP and ANP values to the display processor 84.

After the RNP and ANP are determined, typically after the display processor 84 receives the RNP and ANP values, the length of the extendable bars 268, 270 are continuously calculated, such as by the display processor. While the length of the extendable bars can be calculated according to any of the methods described above, the length of the extendable bars are typically calculated relative to the allowable FTE according to the approximation method above for determining the length of the confidence region 276. (Block 310).

In addition to determining the length of the extendable bars 268, 270, intersecting flight paths 322 that are within the RNP, such as runway approach paths, can be determined, such as by the display processor 84. In this regard, the display processor continuously receives information regarding intersecting flight paths within the RNP of the aircraft, such as from other aircraft guidance systems including the Instrument Landing System (ILS), the Microwave Landing System (MLS) and the Global Navigation Satellite System Landing System (GLS). (Block 312). After receiving the information regarding intersecting flight paths, the display processor can translate the distance relative to the predefined flight path to determine the position of the intersecting flight path pointers 272, 274.

Once the display processor 84 made all necessary calculations and determinations, the display processor displays the deviation pointers 264, 266, extendable bars 268, 270 and intersecting flight path pointers 272, 274 on the respective lateral and vertical flight path scales. (Block 314). Whereas the flight path scales including the deviation pointers, extendable bars and intersecting flight path pointers can be displayed in any of a number of locations on the aircraft, in a preferred embodiment the flight path scales including the deviation pointers, extendable bars and intersecting flight path pointers are displayed on the primary flight displays 142, 144 of the aircraft. (Block 314). As the aircraft deviation, the ANP and/or RNP, or the distance of intersecting flight paths change, the FMC and display processor continuously operate to alter the display accordingly.

As the display processor 84 displays the deviation pointers and extendable bars, the pilot or other air crew member can view the deviation pointer 264 with respect to the extendable bars 268, 270 to ensure that the ANP is within the RNP for the current flight phase. As illustrated in FIGS. 11A–11C, when the actual flight path 322 of the aircraft deviates from the predefined flight path 276, the deviation pointer 264 accordingly deviates from the reference point 252 on the flight path scale of the display. If the ANP of the aircraft is within the RNP, the deviation pointer remains outside of the extendable bars, as shown in FIG. 11B. (FIG. 10, block 316). As the ANP approaches the RNP, however, the extendable bars extend toward the reference point and, thus, the deviation pointer. As illustrated in FIG. 11C, when the deviation pointer reaches any point within the extendable bars, the aircraft no longer has an ANP below the RNP and, thus, the navigation of the aircraft is no longer operating within the required accuracy. If the deviation pointer remains within the extendable bars for more than a predefined period of time, the display can notify the pilot or air crew member of the inadequate ANP level. (FIG. 10, block 318). For example, if the ANP is below the RNP for more than ten seconds, the display can provide a notification by altering the color of the extendable bars, such as from white to yellow.

As long as the aircraft is flying according to LNAV and/or VNAV guidance, the deviation pointers 264, 266, extendable bars 268, 270 and intersecting flight path pointers 272, 274 will be continuously displayed. However, if the aircraft enters a different mode by flying according to a different guidance system, such as ILS after the aircraft intersects an ILS flight path, the display typically changes from the flight path scale displays to an ILS display. The ILS display, although not illustrated, would typically include a glideslope scale in place of the vertical flight path scale along the right side of the attitude director indicator 200. Similarly, the ILS display would also typically include a localizer scale in place of the lateral flight path scale below the attitude director indicator shading.

In various advantageous embodiments, portions of the system and method of the present invention include a computer program product. The computer program product for providing navigation performance based flight path deviation and/or intersecting flight path information includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as logic module 80 as depicted in FIG. 1.

In this regard, FIGS. 1–11 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

The present invention therefore provides pilots and/or air crew members with a clear, concise display of the ANP as it relates to the RNP, intersecting flight paths and current actual flight path deviation from a predefined flight path., in contrast to ANP and RNP displayed on the FMS-CDU in text form along with a large amount of other text information. Therefore, the display of the present invention requires less time, adds less distraction and presents a more intuitive, precise depiction than conventional FMS-CDU displays of ANP and RNP information.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of providing navigation performance based flight path deviation information comprising:

providing at least one flight path scale, wherein each flight path scale comprises a reference point bounded by end markers extending in at least one of a lateral and vertical direction, wherein the reference point relates to an actual flight path, and wherein the end markers represent a required navigation performance (RNP);

determining a deviation of the actual flight path of the aircraft relative to a predefined flight path and thereafter displaying at least one moveable deviation pointer on the at least one flight path scale based upon the deviation and the reference point; and determining an actual navigation performance (ANP) and the RNP based upon a flight phase of the aircraft and thereafter displaying a representation of at least one extendable navigation error on the at least one flight path scale based upon the ANP and RNP, wherein the representation extends from at least one of the end markers toward the reference point of the at least one flight path scale to thereby define at least one navigation performance suspect region.

2. A method according to claim 1 further comprising identifying at least one intersecting flight path and thereafter displaying at least one moveable intersecting flight path pointer on the at least one flight path scale based upon a distance of the intersecting flight path from the actual flight path.

3. A method according to claim 1 further comprising identifying the at least one deviation pointer on the representation of at least one extendable navigation error.

4. A method of providing flight path intersection information comprising:

providing at least one flight path scale, wherein each flight path scale comprises a reference point bounded by end markers extending in at least one of a lateral and vertical direction, wherein the reference point relates to an actual flight path, and wherein the end markers represent a required navigation performance (RNP);

determining a deviation of the actual flight path of the aircraft relative to a predefined flight path and thereafter displaying at least one moveable deviation pointer on the at least one flight path scale based upon the deviation and the reference point; and identifying at least one intersecting flight path and thereafter displaying at least one moveable intersecting flight path pointer on the at least one flight path scale based upon a distance of the intersecting flight path from the actual flight path.

5. A method according to claim 4 further comprising determining an actual navigation performance (ANP) and the RNP based upon a flight phase of the aircraft and thereafter displaying a representation of at least one extendable navigation error on the at least one flight path scale based upon the ANP and RNP, wherein the representation extends from at least one of the end markers toward the reference point of the at least one flight path scale to thereby define at least one navigation performance suspect region.

6. A method according to claim 5 further comprising identifying the at least one deviation pointer on the representation.

7. A navigation performance based flight path deviation display assembly comprising:

a display; and a display processor capable of generating an image upon said display comprising:

at least one flight path scale comprising a reference point bounded by end markers extending in at least one of a lateral and vertical direction, wherein the reference point relates to an actual flight path, and wherein the end markers represent a required navigation performance (RNP);

at least one moveable deviation pointer disposed on said at least one flight path scale, wherein the deviation pointer moves between the end markers based upon a deviation of the actual flight path of the aircraft relative to a predefined flight path; and a representation of at least one extendable navigation error disposed on the flight path scale, wherein said representation extends from at least one of the end markers toward the reference point based upon an actual navigation performance (ANP) and the RNP for the aircraft, wherein said representation defines at least one navigation performance suspect region, and wherein the ANP and RNP are based upon a flight phase of the aircraft.

8. A navigation performance based flight path deviation display assembly according to claim 7 further comprising at least one moveable intersecting flight path pointer disposed on said at least one flight path scale, wherein said at least one intersecting flight path pointer moves based upon a distance of the intersecting flight path from the actual flight path.

9. A navigation performance based flight path deviation display assembly according to claim 7, wherein said representation is capable of identifying the at least one deviation pointer on said representation.

10. A navigation performance based flight path deviation display assembly according to claim 7, wherein the end markers extend equidistant from a respective flight path scale.

11. A flight path intersection display assembly comprising:
- a display; and
- a display processor capable of generating an image upon said display comprising:
  - at least one flight path scale comprising a reference point bounded by end markers extending in at least one of a lateral and vertical direction, wherein the reference point relates to an actual flight path, and wherein the end markers represent a required navigation performance (RNP);
  - at least one moveable deviation pointer disposed on said at least one flight path scale, wherein the deviation pointer moves between the end markers based upon a deviation of the actual flight path of the aircraft relative to a predefined flight path; and
  - at least one moveable intersecting flight path pointer disposed on said at least one flight path scale, wherein said at least one intersecting flight path pointer moves in the area between the end markers based upon a distance of the intersecting flight path from the actual flight path.

12. A flight path intersection display assembly according to claim 11 further comprising a representation of at least one extendable navigation error disposed on said at least one flight path scale, wherein said representation extends from at least one of the end markers toward the reference point based upon an actual navigation performance (ANP) and the RNP for the aircraft, wherein said representation defines at least one navigation performance suspect region, and wherein the ANP and RNP are based upon a flight phase of the aircraft.

13. A flight path intersection display assembly according to claim 12, wherein said representation is capable of identifying the at least one deviation pointer on said representation.

14. A flight path intersection display assembly according to claim 11, wherein the end markers extend equidistant from a respective flight path scale.

15. A computer program product for providing navigation performance based flight path deviation information, the computer program product comprising a computer-readable storage medium having computer-readable program code portions stored therein, the computer-readable program code portions comprising:
- a first executable portion for providing at least one flight path scale, wherein each flight path scale comprises a reference point bounded by end markers extending in at least one of a lateral and vertical direction, wherein the reference point relates to an actual flight path, and wherein the end markers represent a required navigation performance (RNP);
- a second executable portion for determining a deviation of the actual flight path of the aircraft relative to the predefined flight path and thereafter displaying at least one moveable deviation pointer on the at least one flight path scale based upon the deviation; and
- a third executable portion for determining an actual navigation performance (ANP) and the RNP based upon a flight phase of the aircraft and thereafter displaying a representation of at least one extendable navigation error on the at least one flight path scale based upon the ANP and RNP, wherein the representation extends from at least one of the end markers toward the reference point of the at least one flight path scale to thereby define at least one navigation performance suspect region.

16. A computer program product according to claim 15 further comprising a fourth executable portion for identifying at least one intersecting flight path and thereafter displaying at least one moveable intersecting flight path pointer on the at least one flight path scale based upon a distance of the intersecting flight path from the actual flight path.

17. A computer program product according to claim 15 further comprising identifying the at least one deviation pointer on the representation.

18. A computer program product for providing flight path intersection information, the computer program product comprising a computer-readable storage medium having computer-readable program code portions stored therein, the computer-readable program code portions comprising:
- a first executable portion for providing at least one flight path scale, wherein each flight path scale comprises a reference point bounded by end markers extending in at least one of a lateral and vertical direction, wherein the reference point relates to an actual flight path, and wherein the end markers represent a required navigation performance (RNP);
- a second executable portion for determining a deviation of the actual flight path of the aircraft relative to the predefined flight path and thereafter displaying at least one moveable deviation pointer on the at least one flight path scale based upon the deviation; and
- a third executable portion for identifying at least one intersecting flight path and thereafter displaying at least one moveable intersecting flight path pointer on the at least one flight path scale based upon a distance of the intersecting flight path from the actual flight path.

19. A computer program product according to claim 18 further comprising a fourth executable portion for determining an actual navigation performance (ANP) and the RNP based upon a flight phase of the aircraft and thereafter displaying a representation of at least one extendable navigation error on the at least one flight path scale based upon the ANP and RNP, wherein the representation extends from at least one of the end markers toward the reference point of the at least one flight path scale to thereby define at least one navigation performance suspect region.

20. A computer program product according to claim 19 further comprising identifying the at least one deviation pointer on the representation.

* * * * *

UNITED STATES PATENT AND TRADEMARK OFFICE
CERTIFICATE OF CORRECTION

PATENT NO. : 6,571,155 B2
DATED : May 27, 2003
INVENTOR(S) : Carriker et al.

It is certified that error appears in the above-identified patent and that said Letters Patent is hereby corrected as shown below:

Title page,
Item [56], References Cited, OTHER PUBLICATIONS,
"P.B. Ober", reference, "Techinical" should read -- Technical --.
"Dave Nakamara", reference, "Nagigation" should read -- Navigation --.

Signed and Sealed this

Twenty-third Day of September, 2003

JAMES E. ROGAN
*Director of the United States Patent and Trademark Office*